(12) United States Patent
Hata

(10) Patent No.: US 8,495,947 B2
(45) Date of Patent: Jul. 30, 2013

(54) HYDRAULIC CYLINDER

(75) Inventor: Hideki Hata, Yokohama (JP)

(73) Assignee: Hitachi Automotive Systems, Ltd., Ibaraki (JP)

( * ) Notice: Subject to any disclaimer, the term of this patent is extended or adjusted under 35 U.S.C. 154(b) by 806 days.

(21) Appl. No.: 12/724,676

(22) Filed: Mar. 16, 2010

(65) Prior Publication Data
US 2010/0326267 A1 Dec. 30, 2010

(30) Foreign Application Priority Data
Jun. 30, 2009 (JP) ................................ 2009-155224

(51) Int. Cl.
*F16F 9/32* (2006.01)
*F16F 9/18* (2006.01)

(52) U.S. Cl.
USPC ........................................ 91/468; 188/266.6

(58) Field of Classification Search
USPC ........... 91/433, 468; 188/266.1, 266.5, 266.6, 188/322.2, 322.13
See application file for complete search history.

(56) References Cited

U.S. PATENT DOCUMENTS

| 5,180,039 | A | * | 1/1993 | Axthammer et al. | 188/266.6 |
| 5,392,885 | A | * | 2/1995 | Patzenhauer et al. | 188/266.6 |
| 5,413,196 | A | * | 5/1995 | Forster | 188/266.6 |
| 5,533,596 | A | * | 7/1996 | Patzenhauer et al. | 188/266.6 |
| 5,558,189 | A | * | 9/1996 | Beck | 188/266.6 |
| 6,527,093 | B2 | * | 3/2003 | Oliver et al. | 188/322.2 |
| 6,978,871 | B2 | * | 12/2005 | Holiviers | 188/266.6 |
| 7,743,896 | B2 | * | 6/2010 | Vanhees et al. | 188/266.6 |
| 7,926,632 | B2 | * | 4/2011 | Mangelschots et al. | 188/266.6 |
| 8,256,586 | B2 | * | 9/2012 | Mangelschots et al. | 188/266.6 |
| 8,307,965 | B2 | * | 11/2012 | Foster et al. | 188/322.14 |
| 2008/0018030 | A1 | * | 1/2008 | Kiriyama | 267/140.11 |

FOREIGN PATENT DOCUMENTS
JP   2008-45738   2/2008

* cited by examiner

*Primary Examiner* — Thomas E Lazo
(74) *Attorney, Agent, or Firm* — Wenderoth, Lind & Ponack, LLP

(57) ABSTRACT

An object of the present invention is to provide a hydraulic cylinder enabling a reduction in a stress generated by the pressure of hydraulic fluid at a welded portion of a case containing a damping valve. A piston (5) coupled with a piston rod (6) is slidably inserted in a cylinder (2, 3) sealingly containing hydraulic fluid. A joint (17) is attached to the side wall of an outer cylinder (3) of the cylinder. A damping force is generated by controlling a flow of the hydraulic fluid caused by a sliding movement of the piston in the cylinder by a damping force generating mechanism (19) contained in the joint (17). A valve case (18) of the joint (17) has a reduced diameter at a connection portion (23) welded to the outer cylinder (3). The reduced diameter is smaller than the diameter of the damping force generating mechanism (19) contained in the valve case (18). The reduction in the diameter of the connection portion (23) which is a welded portion results in a reduction in a stress generated at the connection portion (23) by the pressure of the hydraulic fluid, whereby the strength against the pressure applied to the welded portion can be increased.

5 Claims, 4 Drawing Sheets

HYDRAULIC CYLINDER

BACKGROUND OF THE INVENTION

The present invention relates to a hydraulic cylinder provided with a damping force generating mechanism at the side of the cylinder body.

A cylindrical shock absorber mounted on a suspension system of a vehicle or the like may comprise a cylinder sealingly containing hydraulic fluid, a piston slidably inserted in the cylinder, a piston rod coupled with the piston, and a passage disposed at the side of the cylinder body and containing a damping valve constituted by a disk valve, an orifice and the like. For example, Japanese Patent Application Public Disclosure No. 2008-45738 (especially FIG. 9) discloses such a shock absorber, and the shock absorber disclosed therein comprises a cylindrical cylinder constituted by axially divided three cylinders. In this shock absorber, the above-mentioned passage is integrally molded with the middle cylinder of the three divided cylinders.

SUMMARY OF THE INVENTION

In the conventional art, the cylinder is constituted by three parts, and therefore a number of connection points exist, disadvantageously resulting in deteriorated productivity.

An object of the present invention is to provide a hydraulic cylinder with improved productivity.

For achieving the above-mentioned and other objects, the present invention provides a hydraulic cylinder comprising:

a cylinder sealingly containing hydraulic fluid;

a piston rod having one end extending to the outside of the cylinder;

a joint having one end fixedly attached to the outer surface of the cylinder, and another end connected to a pipe for sending the hydraulic fluid in the cylinder to the outside; and a damping force generating mechanism disposed in the joint for generating a damping force by controlling a flow of the hydraulic fluid caused by a stroke of the piston rod, the damping force generating mechanism comprising a valve seat member contained in the joint, the valve seat member having a valve seat and a passage through which the hydraulic fluid flows, and a circular disk valve configured to be seated on the valve seat formed at the valve seat member;

wherein the joint is fixedly attached to the cylinder at an attachment portion thereof by welding; and an inner diameter area of the attachment portion is smaller than an outer diameter area of the disk valve.

According to the hydraulic cylinder of the present invention, it is possible to improve the productivity while required durability can be maintained.

DETAILED DESCRIPTION OF THE INVENTION

Hereinafter, embodiments of the present invention will be described in detail with reference to the accompanying drawings.

Figure 1:
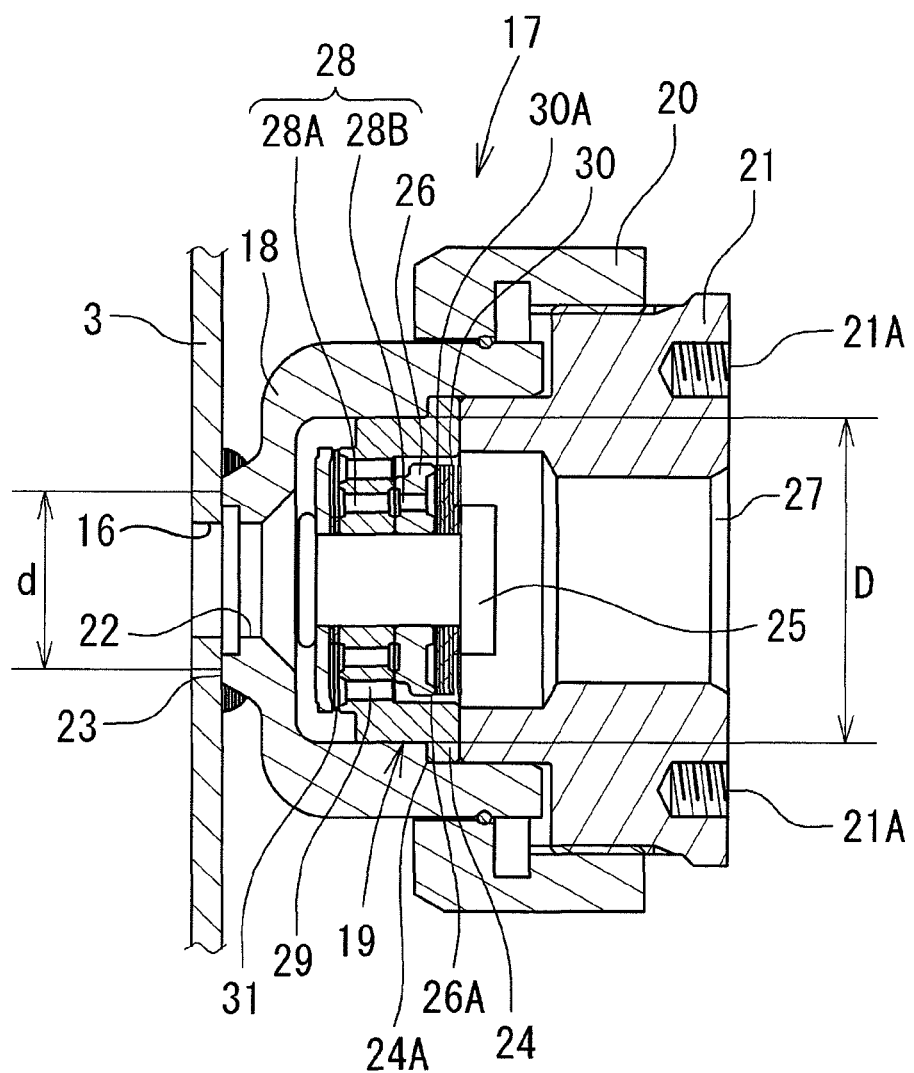
FIG. 1 is an enlarged vertical cross-sectional view illustrating an attachment portion of a damping force generating mechanism, which is an essential portion of a hydraulic cylinder with regard to a first embodiment of the present invention, to an outer cylinder.
Figure 2:
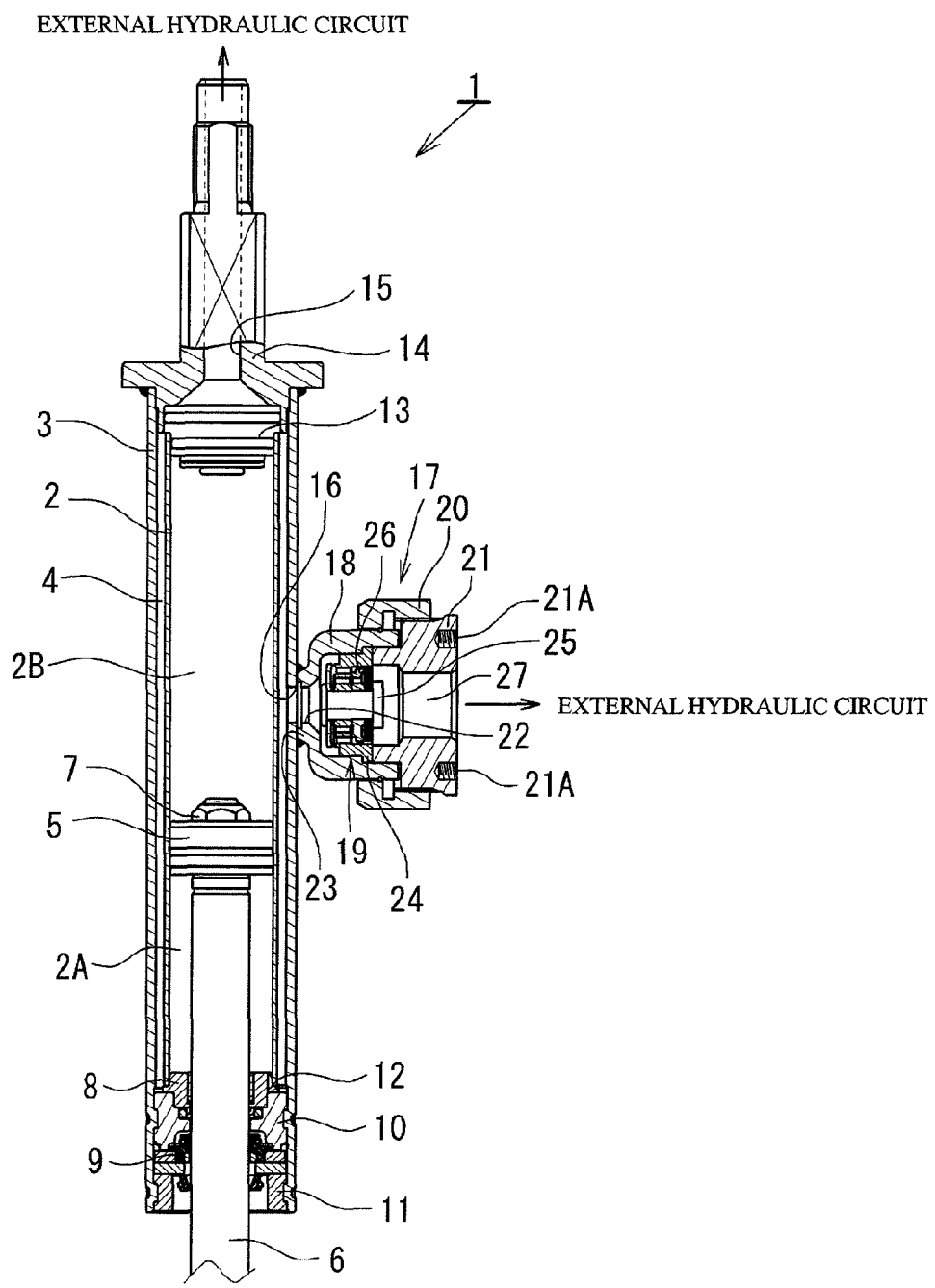
FIG. 2 is a vertical cross-sectional view of the hydraulic cylinder shown in FIG. 1.

FIGS. 1 and 2 illustrate a first embodiment of the present invention.

A hydraulic cylinder 1 in the first embodiment is mounted on a suspension system, and is disposed at each of the front right, front left, rear light and rear left wheels of a vehicle. The respective hydraulic cylinders 1 are connected with one another by pipelines through an external hydraulic circuit, and a flow of hydraulic fluid is generated between the hydraulic cylinders due to, for example, a change in the posture of the vehicle body. Such a flow is controlled by functional components of the external hydraulic circuit such as an accumulator and a damping valve, thereby enabling the control of the vibration and posture of the vehicle body. This kind of suspension system and external hydraulic circuit is disclosed in, for example, the above-mentioned conventional art reference, Japanese Patent Application Public Disclosure No. 2008-45738.

As shown in FIGS. 1 and 2, the hydraulic cylinder 1 has a double cylinder structure comprising a cylindrical inner cylinder 2, a cylindrical outer cylinder 3 disposed around the inner cylinder 2 and an annular passage 4 defined between the inner cylinder 2 and the outer cylinder 3. A piston 5 is slidably inserted in the inner cylinder 2, and divides the interior of the inner cylinder 2 into two chambers, cylinder chambers 2A and 2B. One end of a piston rod 6 is connected to the piston 5 by a nut 7, and the other end of the piston rod 6 is slidably and liquid-tightly inserted through a rod guide 8 and an oil seal 9 attached to the lower ends of the inner cylinder 2 and the outer cylinder 3, and then extends to the outside of the cylinder 1. The rod guide 8 and the oil seal 9 are fixed by retailers 10 and 11 which are fitted in the outer cylinder 3 and fixed by swaging. The cylinder chamber 2A and the annular passage 4 are in communication with each other through a cutout 12 formed at the rod guide 8.

The inner cylinder 2 and the outer cylinder 3 each are formed by cutting of a commonly-used cylindrical tube such as a drawn tube or a welded tube, and each are constituted by one tube. Therefore, the hydraulic cylinder according to the present embodiment is prepared at low cost, has a fewer number of parts, and is light in weight, compared to the invention disclosed in the above-mentioned conventional art reference, Japanese Patent Application Public Disclosure No. 2008-45738, the outer cylinder of which is constituted by two cylindrical tubes and a tube formed by, for example, casting. The above-mentioned inner cylinder 2 and the outer cylinder 3 constitute the cylinder of the present invention.

A damping force generating mechanism 13, which is a second damping force generating mechanism, is attached to the upper end of the inner cylinder 2. The damping force generating mechanism 13 is fixedly fitted in a passage member 14 which is fixed to the upper end of the outer cylinder 3 by welding. A connection port 15, which is a second connection port, is axially formed through the passage member 14. The cylinder chamber 2B is in communication with the connection port 15 through the damping force generating mechanism 13. The upper end of the annular passage 4 is closed by the damping force generating mechanism 13 and the passage member 14. The damping force generating mechanism 13 comprises a damping mechanism constituted by a check valve allowing a flow of the hydraulic fluid from the connection port 15 to the cylinder chamber 2B, an orifice and a disk valve for generating a damping force by controlling a flow of the hydraulic fluid from the cylinder chamber 2B to the connection port 15, and the like. The damping force generating mechanism 13 has a similar structure to that of a damping force generating mechanism 19 which will be described later.

The passage member 14 has screw(s) disposed on the outer circumference thereof for serving as a mounting portion for mount to the vehicle body.

A circular opening 16 is formed at the middle portion of the side wall of the outer cylinder 3. A joint 17 containing the damping force generating mechanism 19 is connected to the opening 16. The joint 17 includes a cylindrical valve case 18 having a reduced diameter at one end, the damping force generating mechanism 19 contained in the valve case 18, and a connection member 21 attached to the open end at the large-diameter side of the valve case 18 by a nut 20. The connection member 21 is provided with a first connection port, a connection port 27 in communication with the interior of the valve case 18. A plurality of screw holes 21A is formed around the connection port 27 for connection of the tip of a connection pipe connected to the not-shown external hydraulic circuit by screws.

An annular connection portion 23 protrudes around an opening 22 formed at the one end and having a reduced diameter of the valve case 18. The connection portion 23 is placed in abutment with the outer surface around the opening 16 of the outer cylinder 3, and then is welded to the side wall of the outer cylinder 3, whereby the valve case 18 is joined to the outer cylinder 3. The connection portion 23 and the outer cylinder 3 are connected to each other by diffusion welding, especially condenser welding. Although condenser welding is the most preferable method since it takes less time and therefore enables the manufacturing time to be reduced, the connection portion 23 and the outer cylinder 3 may be connected to each other by another means for joining the valve case 18 to the tube, such as friction bonding.

The damping force generating mechanism 19 comprises an outer valve member 24 having a bottomed cylindrical shape, and an inner valve member 26 integrally coupled with the inside of the bottom of the outer valve member 24 by a pin 25. The damping force generating mechanism 19 is fixed by fittedly inserting the outer valve member 24 in the valve case 18, and establishing abutment of a stepped portion 24A on the outer surface of the outer valve member 24 against a stepped portion on the inner surface of the valve case 18 with the connection member 21 by tightening of the nut 20.

The damping force generating mechanism 19 comprises an extension-side passage 28 and a compression-side passage 29 for allowing communication between the opening 22 of the valve case 18 and the connection port 27 of the connection member 21. A passage 28A is formed through the inner circumferential side of the bottom of the outer valve member 24, and a passage 28B is formed through the inner valve member 26. The extension-side passage 28 is constituted by the passage 28A and the passage 28B in communication with each other. The compression-side passage 29 is formed through the outer circumferential side of the bottom of the outer valve member 24. The inner valve member 26 comprises a valve seat 26A on which a circular damping valve 30 is seated. The damping valve 30 is adapted to open in response to the pressure of the hydraulic fluid in the extension-side passage 28, thereby generating a damping force. The damping valve 30 is provided with an orifice 30A for allowing constant communication between the extension-side passage 28 and the connection port 27. Further, the outer valve member 24 is provided with a disk-shaped check valve 31 allowing only a flow of the hydraulic fluid from the connection port 27 side to the opening 22 side of the compression-side passage 29. The damping valve 30 and the check valve 31 constitute the disk valve of the present invention, and the outer valve member 24 and the inner valve member 26 constitute the valve seat member of the present invention.

A diameter d, which is the diameter of the connection portion 23 of the valve case 18, is set so as to be smaller than a diameter D, which is the inner diameter of the opening 22 side of the valve case 18. At the same time, the diameter d is adjusted so that the opening 22 can have a sufficient flow area for the extension-side passage 28 and the compression-side passage 29 of the damping force generating mechanism 19. It should be noted that the diameter d is the diameter of the portion that is a connection surface between the outer cylinder 3 and the valve case 18 and receives the inner pressure. This connection portion constitutes the attachment portion of the present invention. The diameter D is the maximum inner diameter of the space inside the valve case 18, to which a pressure is applied by the damping force generating mechanism 19, and which is positioned at the cylinder side relative to the damping force generating mechanism 19.

The first embodiment configured as mentioned above functions as follows. The hydraulic cylinder 1 is mounted so that the passage member 14 and the piston rod 6 are respectively coupled to the sprung side and the unsprung side of each wheel of the vehicle, and the connection port 15 of the passage member 14 and the connection port 27 of the connection member 21 are respectively connected to the external hydraulic circuit constituting the suspension system.

During an extension stroke of the piston rod 6, a sliding movement of the piston 5 in the inner cylinder 2 causes the hydraulic fluid in the cylinder chamber 2A to be pressurized and sent to the external hydraulic circuit through the cutout 12, the annular passage 4, the opening 16, the opening 22, the extension-side passage 28 and the connection port 27. On the other hand, the cylinder chamber 2B is depressurized due to the sliding movement of the piston 5 in the inner cylinder 2, whereby the hydraulic fluid is sent into the cylinder chamber 2B from the external hydraulic circuit connected to the connection port 15 of the passage member 14 through the check valve of the damping force generating mechanism 13. In this way, when the piston rod 6 performs an extension stroke, a damping force is generated by the orifice 30A and the damping valve 30 of the damping force generating mechanism 19, and a resistance force is generated by the external hydraulic circuit.

During a compression stroke of the piston rod 6, a sliding movement of the piston 5 in the inner cylinder 2 causes the hydraulic fluid in the cylinder chamber 2B to be pressurized and sent to the external hydraulic circuit connected to the connection port 15 of the passage member 14 through the damping force generating mechanism 13. On the other hand, the cylinder chamber 2A is depressurized due to the sliding movement of the piston 5 in the inner cylinder 2, whereby the hydraulic fluid is sent into the cylinder chamber 2A from the external hydraulic circuit connected to the connection port 27 through the compression-side passage 29, the check valve 31, the opening 22, the opening 16, the annular passage 4 and the cutout 12. In this way, when the piston rod 6 performs a compression stroke, a damping force is generated by the damping mechanism of the damping force generating mechanism 13, and a resistance force is generated by the external hydraulic circuit.

For example, between the hydraulic cylinders 1 mounted on the right and left wheels of the vehicle, each cylinder chamber 2A and each cylinder chamber 2B are communicated with each other by the connection of the connection port 27 in the joint 17 and the connection port 15 to the external hydraulic circuit comprising an accumulator. Due to this communication, the reactive force from the accumulator is small when the hydraulic cylinders 1 at the right and left wheels perform strokes in the same direction (same phase), and the reactive force from the accumulator is large when the hydraulic cylinders 1 at the right and left wheels perform strokes in different directions (reversed phase), whereby it is possible to obtain the stabilizer effect for reducing a change in the posture of the vehicle body when the vehicle turns.

A person skilled in the art cannot reach the idea of reducing the diameter d of the connection portion 23 just by exercising ordinary creativity, since reducing the diameter d of the connection portion 23 seems problematic because a stress in the bending direction is applied to the connection portion 23 by, for example, the weight of the not-shown connection pipe. However, in the present invention, specifically, a hydraulic cylinder in which a high pressure higher than 20 MPa acts on the connection portion 23 is taken into consideration. Then, the diameter of the one end of the valve case 18 is reduced so that the diameter d of the connection portion 23, which is a welded portion to the outer cylinder 3, becomes smaller than the diameter D of the damping force generating mechanism 19, whereby it is possible to reduce a circumferential stress (hoop stress) and a vertical stress generated at the connection portion 23 which is the welded portion by the pressure of the hydraulic fluid pressurized by the piston 5. As a result, the strength of the welded portion against the pressure of the hydraulic fluid can be increased, and the durability of the hydraulic cylinder can be improved on the whole. Especially, in the hydraulic cylinder 1, the high pressure of the pressurized fluid in the cylinder chamber 2A directly acts on the connection portion 23 when the piston rod 6 performs an extension stroke. Therefore, it is important to increase the strength of the connection portion 23 against the hydraulic pressure.

Here, the circumferential stress $\sigma$ (hoop stress) when an inner pressure p is applied to a thin cylinder (thickness: t, diameter: d) is expressed as follows:

$$\sigma = dp/2t \quad (1)$$

The vertical stress $\tau$ is expressed as follows:

$$\tau = dp/4t \quad (2)$$

The expressions (1) and (2) indicate that the circumferential stress $\sigma$ and the vertical stress $\tau$ generated at the connection portion 23 by the pressure of the hydraulic fluid can be reduced by a sufficient reduction in the diameter d of the connection portion 23 which is the welded portion in such a manner that the opening 22 can have a sufficient flow passage area for the extension-side passage 28 and the compression-side passage 29 of the damping force generating mechanism 19, whereby it is possible to increase the strength of the connection portion 23 against the pressure of the hydraulic fluid.

Comparison is made between the circumferential stress $\sigma1$ and the vertical stress $\tau1$ in the invention disclosed in the above-mentioned conventional art reference, Japanese Patent Application Public Disclosure 2008-45738, and the circumferential stress $\sigma2$ and the vertical stress $\tau2$ in the first embodiment of the present invention. In Japanese Patent Application Public Disclosure 2008-45738, the diameter d of the connection portion 23 is the same as the diameter D of the damping force generating mechanism 19. The diameter D is 35 mm and the thickness t1 of the connection portion 23 is 1.5 mm. In the first embodiment of the present invention, the diameter d of the connection portion 23 is 13 mm and the thickness t2 of the connection portion 23 is 2.5 mm. Then, the stress ratio $\sigma2/\sigma1$ and $\tau2/\tau1$ are as follows:

$$\sigma2/\sigma1 = \tau2/\tau1 = t1 \cdot d/t2 \cdot D = 0.22$$

Therefore, in this case, the first embodiment of the present invention can reduce the circumferential stress $\sigma$ and the vertical stress $\tau$ generated at the connection portion 23 by the inner pressure of the hydraulic fluid by 78%, compared to the conventional art.

Further, the influence of the curvature of the cylinder surface against the outer surface of the outer cylinder 3 that is not flat but curved is diminished by reducing the diameter d of the connection portion 23, resulting in facilitation of the abutment of the connection portion 23; thereby enabling even the flat surface of the tip of the connection portion to be welded to the curved surface of the outer cylinder. As a result, the productivity can be improved.

Further, in the conventional art, the valve boss corresponding to the joint in the present invention is connected to the reservoir having a lower pressure and a smaller pressure change than those of the cylinder. On the other hand, in the hydraulic cylinder in the first embodiment of the present invention, the joint is connected to the outer cylinder 3 which is a pressure chamber having a high pressure and a large pressure change. Therefore, in the first embodiment of the present invention, a heavier load is applied to the connection portion 23 due to the pressure and the pressure change, but the structure of the present invention contributes to enhancement of the strength of the connection portion 23 against the pressure change of the hydraulic fluid.

It should be noted that the diameter D of the damping force generating mechanism 19 is set based on the required diameters of the disk valves contained in the damping force generating mechanism 19 such as the damping valve 30 and the check valve 31. That is, the diameter D has a slightly larger value than those of these disk valves.

As mentioned above, in the first embodiment of the present invention, the outer cylinder 3 integrally formed is provided with the opening 16, and the joint 17 is connected to the outer cylinder 3 by welding. On the other hand, in the conventional art, the cylinder is constituted by axially divided three tubes. Therefore, the first embodiment of the present invention, compared to the conventional art, can advantageously reduce the number of required manufacturing processes and the number of required components, thus improving the productivity.

Next, variants of the above-discussed first embodiment of the present invention will be described with reference to FIGS. 3 and 4. In the following description, like components will be denoted by like reference numerals as of the first embodiment shown in FIGS. 1 and 2, and only different points will be described in detail.

Figure 3:
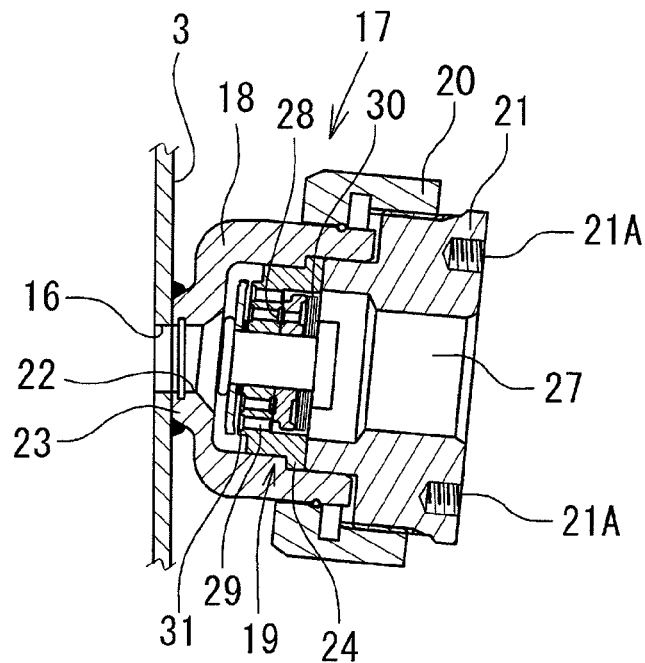
FIG. 3 is an enlarged vertical cross-sectional view illustrating an attachment portion of a damping force generating mechanism which is an essential portion of a variant of the hydraulic cylinder shown in FIG. 1.
Figure 4:
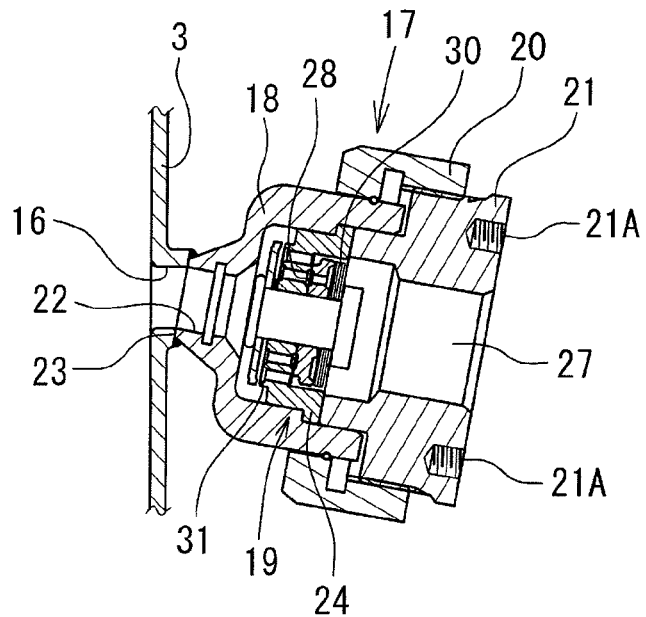
FIG. 4 is an enlarged vertical cross-sectional view illustrating an attachment portion of a damping force generating mechanism which is an essential portion of another variant of the hydraulic cylinder shown in FIG. 1.

The variant shown in FIG. 3 is characterized in that the connection portion 23 of the valve case 18 is inclined, and the joint 17 is attached to the outer cylinder 3 in a downwardly inclined state. The variant shown in FIG. 4 is characterized in that the connection portion 23 of the valve case 18 has an elongated protrusion and the circumference of the opening 16 of the outer cylinder 3 protrudes outwardly with the tip thereof inclined so that the joint 17 is attached to the outer cylinder 3 in a downwardly inclined state. These characteristic features prevent the joint 17 from interfering with parts in the vicinity thereof and vice versa, and enables adjustment of the connection angle of the pipe of the external hydraulic circuit connected to the connection port 27 of the connection member 21. These variants require modification of the shape of the valve case 18 or the outer cylinder 3, but this modification can be achieved by plastic working since the opening 16 has a small inner diameter, thereby realizing low cost manufacturing and weight reduction, compared to the cast parts of the invention disclosed in the above-mentioned conventional art reference, Japanese Patent Application Public Disclosure No. 2008-45738.

Next, a second embodiment of the present invention will be described with reference to FIG. 5. In the following description, like components will be denoted by like reference numerals as of the first embodiment shown in FIGS. 1 and 2, and only different points will be described in detail.

Figure 5:
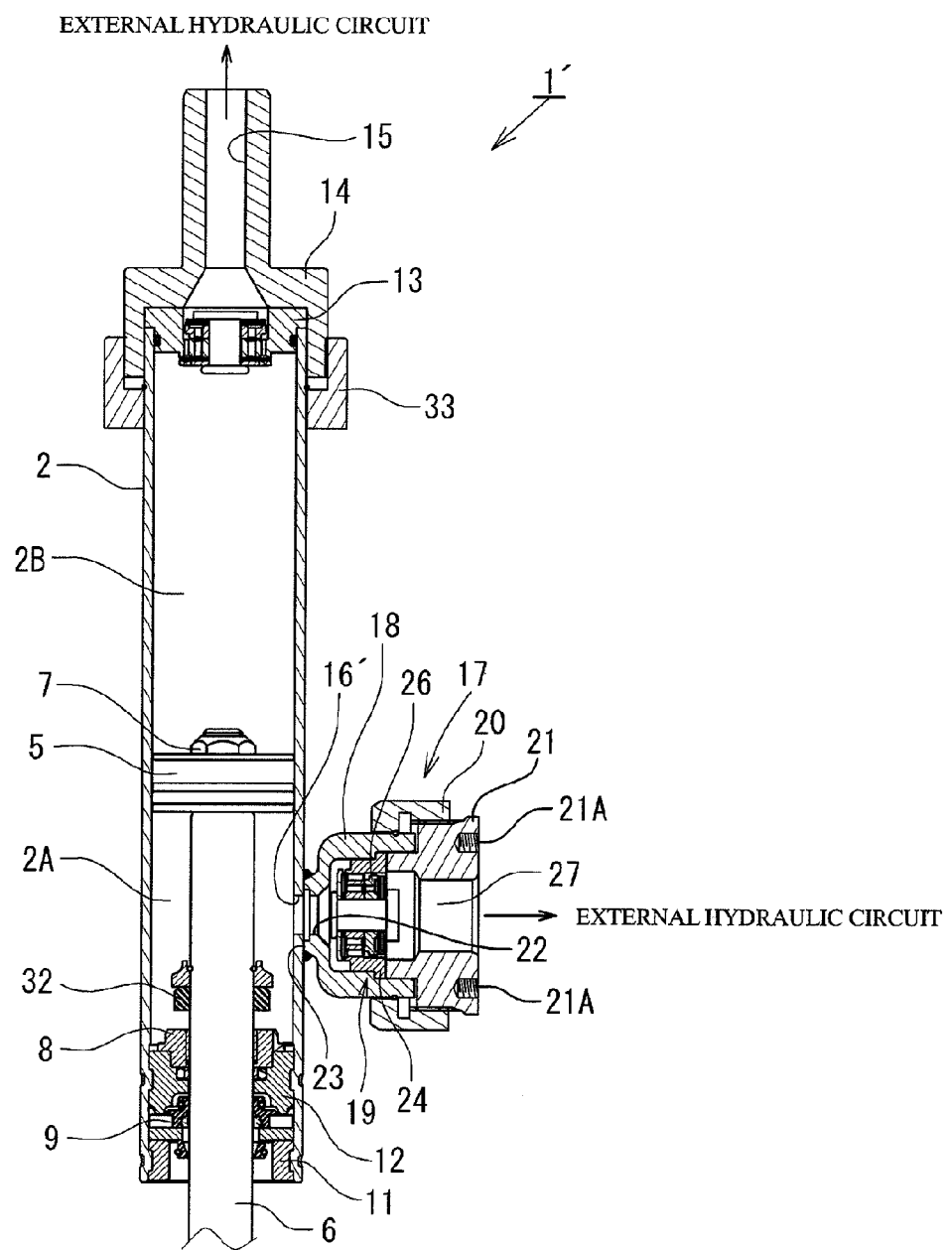
FIG. 5 is a vertical cross-sectional view illustrating a hydraulic cylinder with regard to a second embodiment of the present invention.

As shown in FIG. 5, a hydraulic cylinder 1' in the second embodiment does not have the outer cylinder 3, and the inner cylinder 2 also serves as an outer cylinder. Therefore, an opening 16' is formed on the side wall of the lower portion of the inner cylinder 2. The connection portion 23 of the valve case 18 of the joint 17 is welded to the side wall of the inner cylinder 2, and the opening 22 is in direct communication with the cylinder chamber 2A through the opening 16'. Therefore, a rebound stopper 32 for limiting a stroke of the piston rod 6 in the extension direction is disposed at the piston rod 6 to prevent the piston 5 from interfering with the opening 16'. Further, the passage member 14 is attached to the upper end of the inner cylinder 2 by a nut 33. According to the second embodiment, simplification of the structure can be realized compared to the first embodiment. In the second embodiment, the inner cylinder 2 constitutes the cylinder of the present invention.

The above-discussed first and second embodiments comprise the valve case 18 having a cylindrical shape. A cylindrical shape allows the valve case 18 to be formed by drawing of a circular tube, to be manufactured at low cost, to have a light weight. However, the shape of the valve case 18 is not limited to a cylindrical shape, and the valve case 18 may be oval or polygonal in cross section when the valve case 18 cannot be circular in cross section due to the circumstances including the space therefor.

Further, the above-discussed first and second embodiments employ a circular shape for all of the opening 16, the opening 22 and the connection portion 23. However, their shapes are not limited to a circular shape, and may be oval or polygonal. Especially, if the connection portion 23 has an oval shape having an elongated diameter in the axial direction of the cylinder, the welded area can be increased.

In the above description of the first and second embodiments, the hoop stress was explained with use of the term "diameter", since the connection portion 23, which corresponds to the attachment portion of the present invention, has a circular shape. However, in the present invention, the attachment portion may have a non-circular shape, and the damping force generating mechanism 19 may have various shapes and configurations. Therefore, the area (inner diameter area) of the portion of the attachment portion which the inner pressure acts on is compared to the area (outer diameter area) of the outer shape of the disk valve, and the present invention is configured such that the inner diameter area of the attachment portion is smaller than the outer diameter area of the disk valve.

Further, the above-discussed first and second embodiments have the piston rod 6 extending to the unsprung side, that is, the first and second embodiments employ an inverted shock absorber. This is because a stress of vibration applied to the connection portion 23 can be reduced by disposing the connection portion 23 at the vehicle body side (sprung side) having dampened vibration, thereby allowing the inner diameter area of the attachment portion to be further reduced. In addition to that, the selection of this type of shock absorber is derived from consideration of the pipe arrangement to the external hydraulic circuit. However, the present invention may employ another type of shock absorber.

Although only some exemplary embodiments of this invention have been described in detail above, those skilled in the art will readily appreciate that many modifications are possible in the exemplary embodiments without materially departing from the novel teaching and advantages of this invention. Accordingly, all such modifications are intended to be included within the scope of this invention.

The present application claims priority under 35 U.S.C. section 119 to Japanese Patent Application No. 2009-155224, filed on Jun. 30, 2009. The entire disclosure of Japanese Patent Application No. 2009-155224, filed on Jun. 30, 2009 including specification, claims, drawings and summary is incorporated herein by reference in its entirety.

What is claimed is:

1. A hydraulic cylinder comprising:
a cylinder sealingly containing hydraulic fluid;
a piston rod having one end extending to the outside of the cylinder;
a joint having one end fixedly attached to the outer surface of the cylinder, and another end connected to a pipe for sending the hydraulic fluid in the cylinder to the outside; and
a damping force generating mechanism disposed in the joint for generating a damping force by controlling a flow of the hydraulic fluid caused by a stroke of the piston rod,
the damping force generating mechanism comprising
a valve seat member contained in the joint, the valve seat member having a valve seat and a passage through which the hydraulic fluid flows, and
a circular disk valve configured to be seated on the valve seat formed at the valve seat member;
wherein the joint is fixedly attached to the cylinder at an attachment portion thereof by welding; and
an inner diameter area of the attachment portion is smaller than an outer diameter area of the disk valve.

2. The hydraulic cylinder according to claim 1, further comprising a first connection port for connection of one chamber in the cylinder to an external hydraulic circuit through the damping force generating mechanism, and a second connection port for connection of another chamber in the cylinder to the external hydraulic circuit through a second damping force generating mechanism.

3. The hydraulic cylinder according to claim 2, wherein the attachment portion of the joint is attached to the outer surface of the cylinder by diffusion welding.

4. The hydraulic cylinder according to claim 1, wherein the attachment portion of the joint is attached to the outer surface of the cylinder by diffusion welding.

5. The hydraulic cylinder according to claim 4, wherein the cylinder is constituted by a cylindrical tube, a circular hole is formed at the outer surface of the cylindrical tube, and the joint is welded to a portion around the hole.

* * * * *